United States Patent
Bridges, Jr. et al.

(10) Patent No.: US 8,308,428 B2
(45) Date of Patent: Nov. 13, 2012

(54) SEAL ASSEMBLY RETENTION FEATURE AND ASSEMBLY METHOD

(75) Inventors: Joseph W. Bridges, Jr., Durham, CT (US); Tracy A. Propheter-Hinckley, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 1435 days.

(21) Appl. No.: 11/869,142

(22) Filed: Oct. 9, 2007

(65) Prior Publication Data

US 2009/0092485 A1    Apr. 9, 2009

(51) Int. Cl.
*F01D 11/00*    (2006.01)

(52) U.S. Cl. ........ 415/139; 277/630; 277/637; 277/641; 277/642; 277/644

(58) Field of Classification Search ................... 415/134, 415/139, 173.1, 173.7; 277/421, 630, 637, 277/638, 641, 642, 648, 649
See application file for complete search history.

(56) References Cited

U.S. PATENT DOCUMENTS

| | | | |
|---|---|---|---|
| 4,524,980 A * | 6/1985 | Lillibridge et al. | ........... 277/641 |
| 4,549,058 A | 10/1985 | DelMastro | |
| 4,557,412 A | 12/1985 | Lillibridge | |
| 4,749,333 A | 6/1988 | Bonner | |
| 5,531,457 A | 7/1996 | Tibbott | |
| 5,709,530 A | 1/1998 | Cahill | |
| 5,762,472 A * | 6/1998 | Pizzi et al. | ..................... 415/135 |
| 5,868,398 A | 2/1999 | Maier | |
| 5,971,703 A * | 10/1999 | Bouchard | ..................... 415/135 |
| 7,217,081 B2 | 5/2007 | Scheurlen | |
| 7,220,099 B2 | 5/2007 | Bekreney | |
| 2006/0082074 A1 | 4/2006 | Synnott | |
| 2006/0182624 A1* | 8/2006 | London et al. | ............. 415/170.1 |
| 2006/0239814 A1* | 10/2006 | Uwami et al. | ................. 415/134 |
| 2006/0263204 A1 | 11/2006 | London et al. | |
| 2007/0140843 A1* | 6/2007 | Drerup et al. | ............. 415/209.3 |
| 2009/0096174 A1* | 4/2009 | Spangler et al. | ............... 277/345 |

FOREIGN PATENT DOCUMENTS

| | | |
|---|---|---|
| DE | 102006004613 A1 | 8/2006 |
| EP | 1798380 A2 | 6/2007 |

OTHER PUBLICATIONS

EP Search Report dated Dec. 16, 2011.

* cited by examiner

*Primary Examiner* — Igor Kershteyn
*Assistant Examiner* — Jesse Prager
(74) *Attorney, Agent, or Firm* — Carlson, Gaskey & Olds PC

(57) ABSTRACT

A seal assembly includes a body having two circumferential sides, a leading end, and a trailing end. At least one of the circumferential sides includes a first channel sidewall, a second channel sidewall, and a channel bottom wall that together define a seal channel for receiving a seal. The seal channel includes a slot that cooperates with a tab on the seal to facilitate securing the seal within the seal channel.

17 Claims, 9 Drawing Sheets

SEAL ASSEMBLY RETENTION FEATURE AND ASSEMBLY METHOD

This invention was made with government support under Contract No. N00019-02-C-3003 awarded by the United States Air Force. The government therefore has certain rights in this invention.

BACKGROUND OF THE INVENTION

This invention relates to seals and, more particularly, to a component having a retention feature for limiting movement of a feather seal.

Feather seals are commonly known and used in aerospace and other industries to provide a seal between two adjacent components. For example, gas turbine engine vanes are arranged in a circumferential configuration to form a vane ring about a center axis of the engine. Typically, each vane includes an airfoil and a platform section. When assembled into the ring, the platforms abut and define a radially inner section for receiving hot gas flow and a radially outer surrounding section.

Typically, the platforms include channels for receiving a feather seal that seals the radially inner section from the radially outer section. Although feather seals often provide effective sealing, conventional feather seals may become damaged during assembly of the vanes into the vane ring. For example, the vanes may be manually arranged into the vane ring configuration before assembly into the engine. During assembly, the vane positions may be adjusted to achieve the desired vane ring alignment, which may cause the feather seals to become liberated from the channels or cause the feather seals to move within the channels. The movement may damage the seals or cause the seals to move from a desired sealing position and thereby prevent the feather seal from properly sealing. Additionally, dimensional variation of the channels and seals may contribute to slightly oversized or undersized channels that permit seal movement or pinch the seals. Moreover, once the vane ring is assembled, disassembly of multiple vanes may be required if it is necessary to replace a damaged feather seal.

SUMMARY OF THE INVENTION

An example seal assembly includes a body having two circumferential sides, a leading end, and a trailing end. At least one of the circumferential sides includes a first channel sidewall, a second channel sidewall, and a channel bottom wall that together define a seal channel for receiving a seal. At least one of the first channel sidewall, the second channel sidewall, or the channel bottom wall includes a slot for limiting movement between the seal and the seal channel.

In one example, the seal assembly includes a first component and a second component adjacent the first component. The first component and the second component each include the body such that one of the circumferential sides of the first component is adjacent one of the circumferential sides of the second component. The circumferential sides each include a seal channel, and at least one of the seal channels includes a first channel sidewall, a second channel sidewall, and a channel bottom wall that together define the seal channel, and at least one of the first channel sidewall, the second channel sidewall, or the channel bottom wall includes a slot. A seal is at least partially within the seal channels. The seal includes a retention feature that cooperates with the slot to limit movement between the seal and the seal channels.

In another aspect, an example method of limiting movement between the seal and the seal channel includes inserting the tab of the seal at least partially into the slot of the seal channel to limit movement between the seal and the seal channel.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

The disclosed examples provide a retention feature for use in turbine vanes or other segmented sealed components that limits movement of a feather seal used between the components, such as during assembly of the components.

Figure 1:
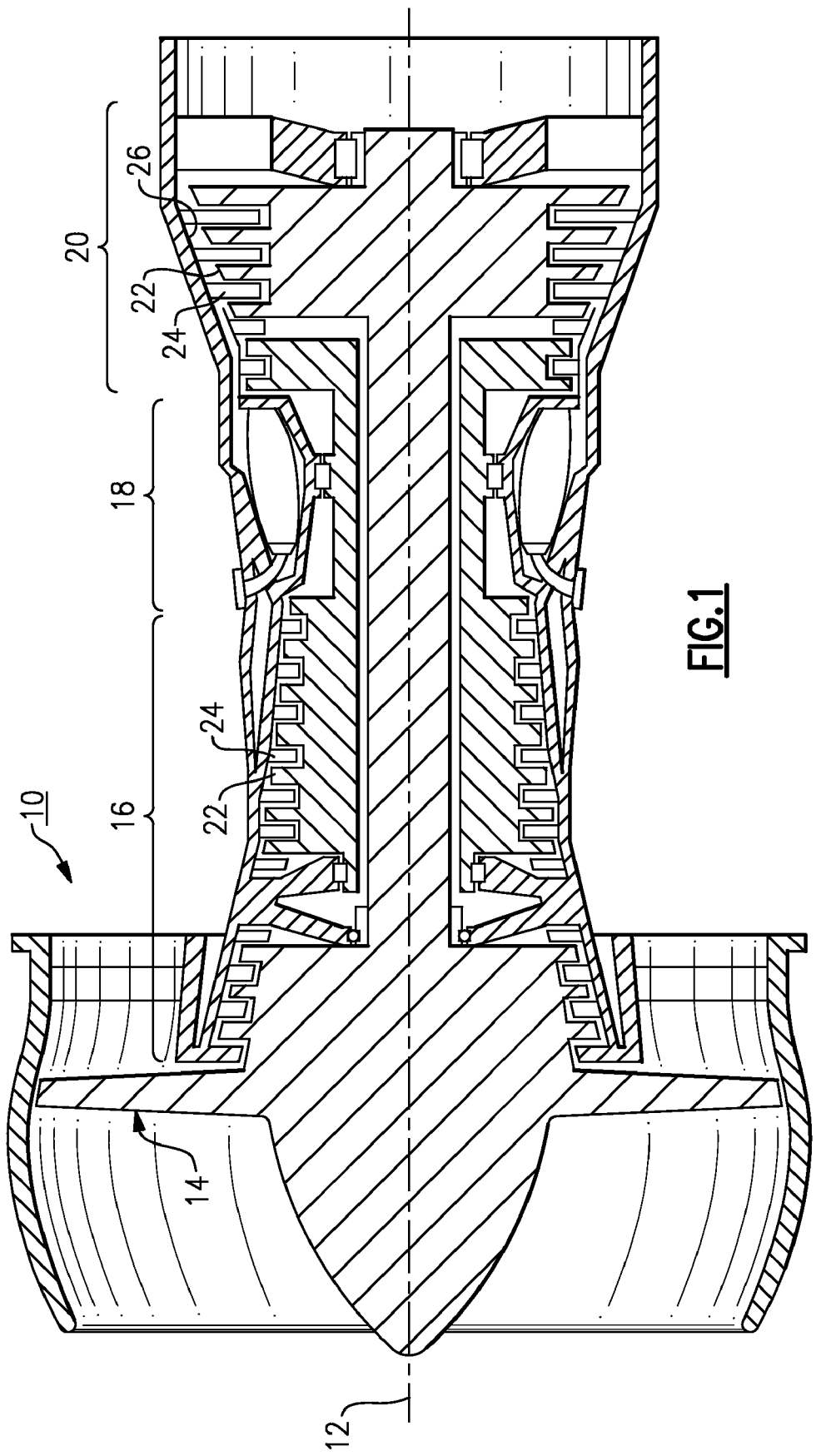
FIG. 1 illustrates selected portions of an example gas turbine engine.

FIG. 1 illustrates selected portions of an example gas turbine engine 10, such as a gas turbine engine 10 used for propulsion. In this example, the turbine engine 10 is disposed about an engine centerline 12 and includes a fan 14, a compressor section 16, a combustion section 18, and a turbine section 20. The combustion section 18 and the turbine section 20 include corresponding blades 22 and vanes 24. Blade outer air seal segments 26 (shown schematically) are disposed circumferentially about the turbine section 20 to define a hot gas path between an outer structure of the gas turbine engine 10 and the turbine section 20. For example, the segments may form a ring around the engine centerline 12. One non-limiting example of the blade outer air seal segments 26 can be found in U.S. Pat. No. 5,639,210.

As is known, air compressed in the compressor section 16 is mixed with fuel and burned in the combustion section 18 to produce hot gases that are expanded in the turbine section 20. FIG. 1 is a somewhat schematic presentation for illustrative purposes only and is not a limitation on the disclosed examples. Additionally, there are various types of gas turbine engines, many of which could benefit from the examples disclosed herein, which are not limited to the design shown.

Figure 2:
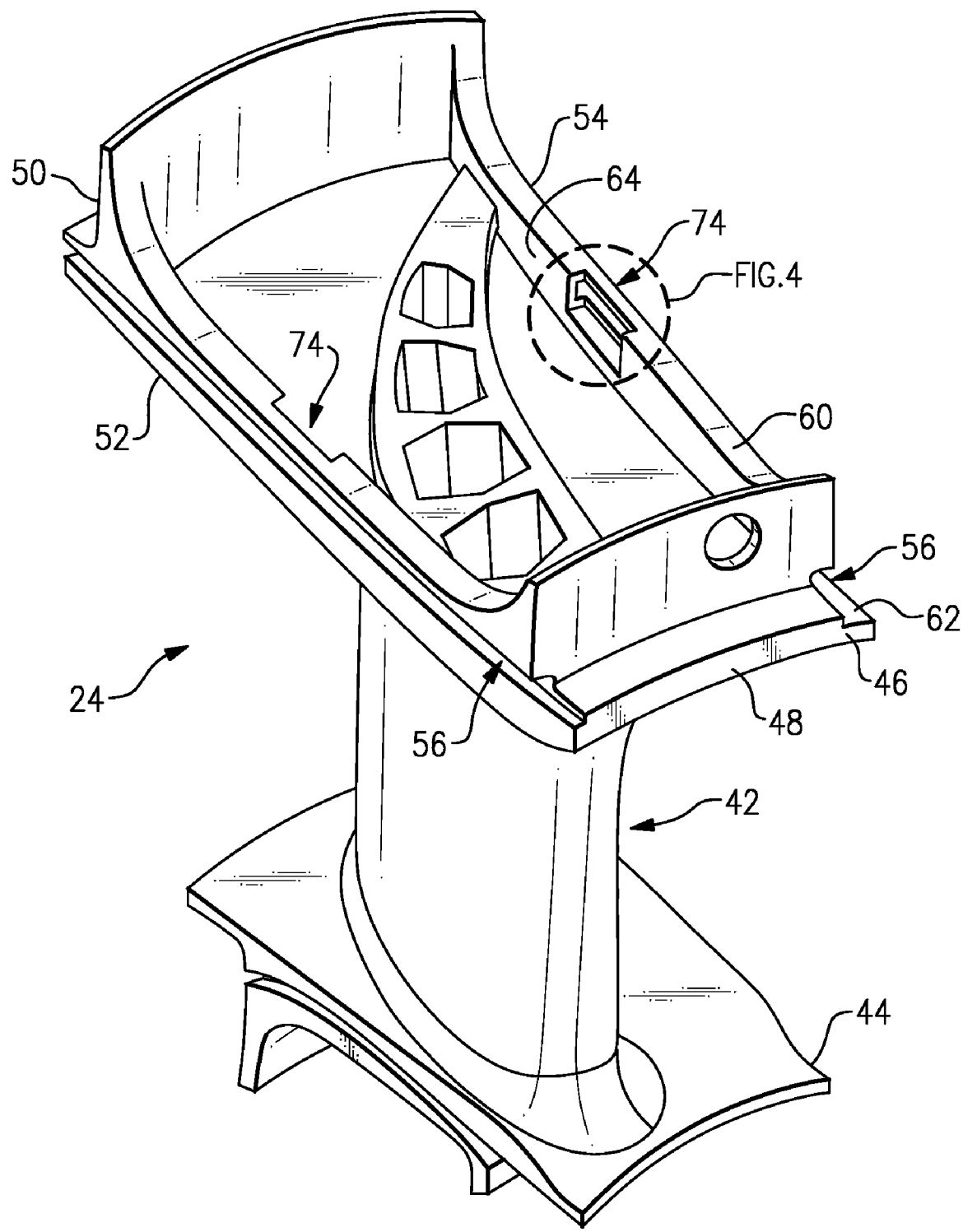
FIG. 2 illustrates selected portions of an example vane of the gas turbine engine.

FIG. 2 illustrates an example of one of the vanes 24 from the gas turbine engine 10. For example, a plurality of the vanes 24 are arranged circumferentially about the engine center line 12 in a vane ring assembly. In this example, each of the vanes 24 includes an airfoil section 42 coupled with an inner platform 44 and an outer platform 46. The inner platform 44 is oriented near to the engine center line 12, while the outer platform 46 is oriented away from the engine center line 12.

The inner platform 44 and the outer platform 46 may be relatively similar with respect to sealing between the vanes 24. For illustrative purposes, the outer platform 46 will be described, although it is to be understood that the disclosed examples may also apply to the inner platform 44. Further, although the vane 24 is the basis of the disclosed examples, the examples are also applicable to the blades 22, the blade outer air seal segments 26, or other segmented sealed components, for example.

Figure 3:
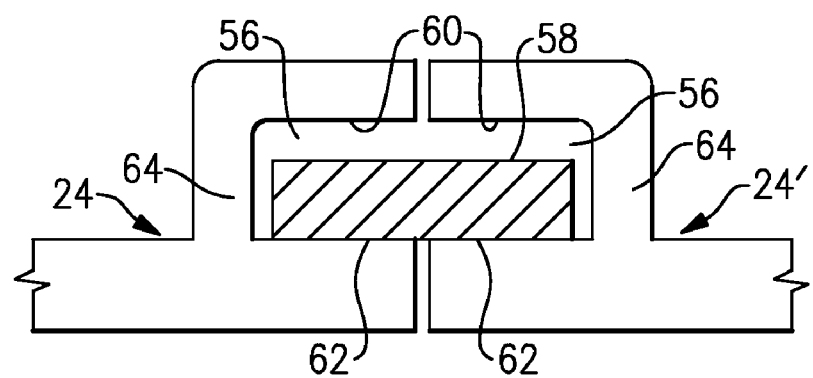
FIG. 3 illustrates selected portions of example seal channels between adjacent vanes.

In the illustrated example, the outer platform 46 includes a leading end 48 and a trailing end 50 that extend between circumferential sides 52 and 54. Each of the circumferential sides 52 and 54 includes a seal channel 56. When the vanes 24 are assembled into a vane ring pack, the channels 56 of one vane 24 are adjacent the channels 56 of an immediately adjacent vane 24' and form a cavity for receiving a feather seal 58, as illustrated in FIG. 3.

In the illustrated example, each circumferential side 52 or 54 includes a first sidewall 60 and an opposed second sidewall 62 that are joined by a channel bottom wall 64 to define the seal channel 56.

Figure 4:
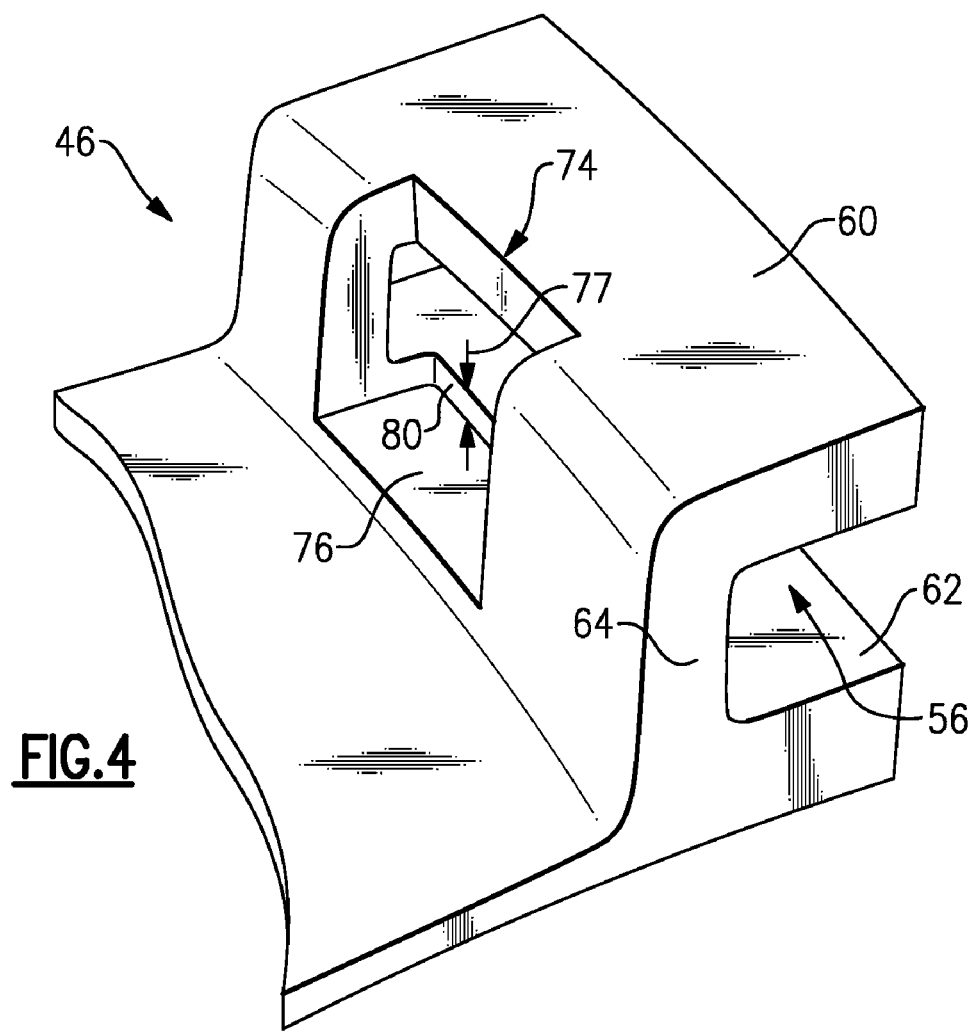
FIG. 4 illustrates an example retention feature of a seal channel.
Figure 5:
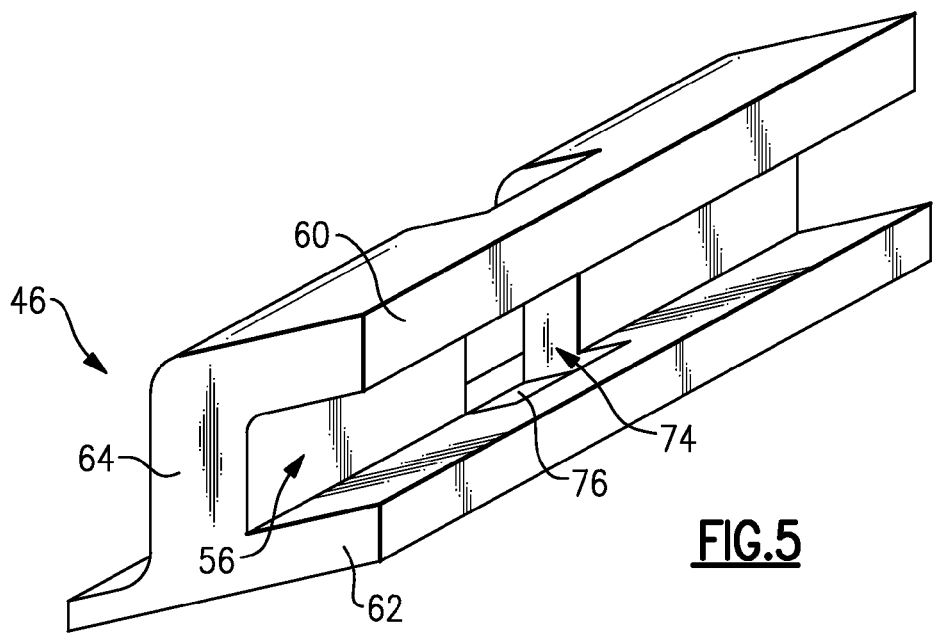
FIG. 5 illustrates an alternate view of the retention feature.
Figure 6:
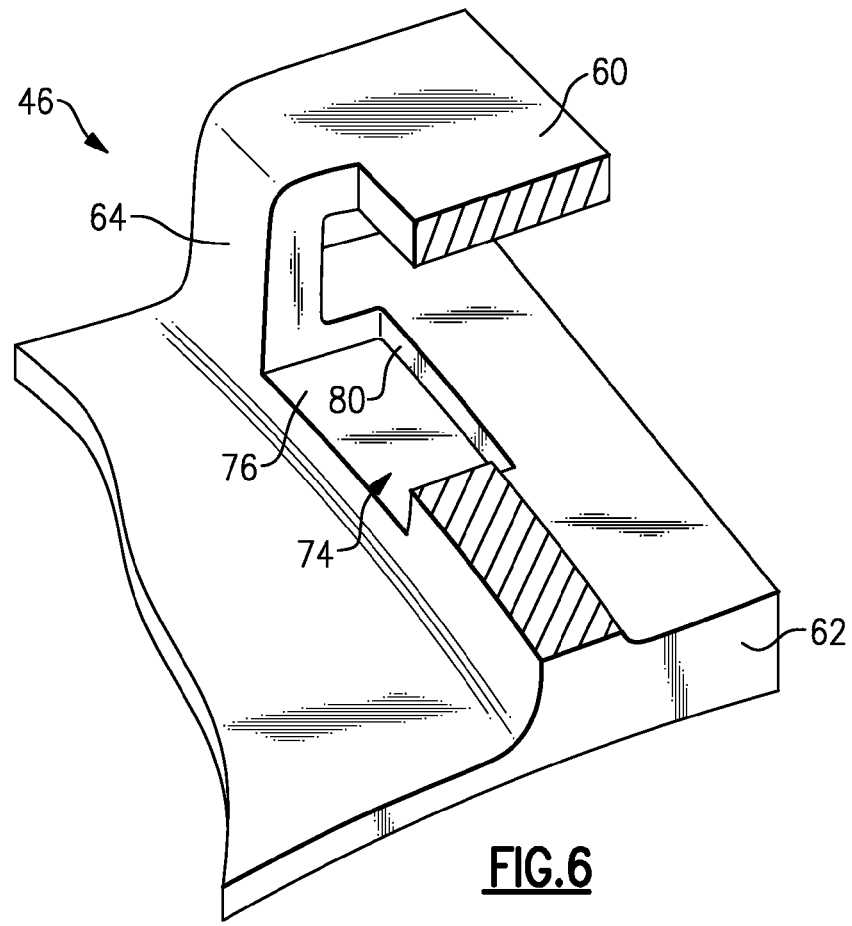
FIG. 6 illustrates a sectional view of the retention feature.

Referring also to the portions of the outer platform 46 illustrated in FIGS. 4-6, the outer platform 46 includes a retention feature 74 for limiting movement between the feather seal 58 and the seal channel 56. As discussed above, conventional feather seals may become damaged during assembly into a vane ring assembly. However, the retention feature 74 disclosed herein limits movement of the feather seal 58 relative to the seal channel 56 during assembly into a vane ring assembly to reduce the opportunity of damaging the feather seal 58.

As shown, each circumferential side 52 and 54 includes one of the retention features 74. However, alternatively, only one of the circumferential sides 52 or 54 may include the retention feature, and in other examples one or both of the circumferential sides 52 and 54 may include multiple retention features 74. Likewise, the circumferential sides of the inner platform 44 may include none, one, or multiple retention features 74.

In the disclosed example, the retention feature 74 comprises a slot 76 for receiving a tab 78 (FIG. 7) that extends generally perpendicularly from a main body 79 of the feather seal 58. The term "perpendicular" refers to a nominal geometry, such as within a desired tolerance. The slot 76 and the tab 78 cooperate to limit, and in some examples prevent, circumferential movement of the feather seal 58 relative to the seal channel 56. The forward and trailing sides of the slot 76 abut the forward and trailing ends of the tab 78 to limit circumferential movement between the feather seal 58 and the seal channel 56. In some examples, the slot 76 and the tab 78 may also cooperate to limit axial movement of the feather seal 58, depending on the shape of the slot 76, shape of the tab 78, or the fit between the slot 76 and the tab 78.

The slot 76 may be any of a variety of different shapes or sizes, depending upon the desired design of the feather seal 58 or other design considerations. Further, the slot 76 may be formed in the outer platform using a suitable forming method, such as machining, casting, or other known method. In the illustrated example, the slot 76 extends entirely through the channel bottom wall 64, partially through the channel sidewall 60 and partially through the channel sidewall 62.

The slot 76 includes a recess or step 80 relative to the channel sidewall 62. The step 80 provides the benefit of offsetting the bottom of the slot 76 from the channel sidewall 62 such that the feather seal 58 is in a desired seal position that is flush with the channel sidewall 62.

In one example, the size of the step 80 is at least as great as the combined dimensional variation from the manufacturing of the platform 46 and the slot 76. For example, casting the platform 46 may result in a dimensional variation of =X and machining the slot 76 may result in a dimensional variation of ±Y for a minimum step size 77 of X+Y (FIG. 4). Designing the size of the step 80 based on the dimensional variations provides the benefit of assuring that the bottom of the slot 76 is recessed from the channel sidewall 62 such that the bottom of the slot 76 does not inhibit the feather seal 58 from sitting flush with the channel sidewall 62.

Figure 7:
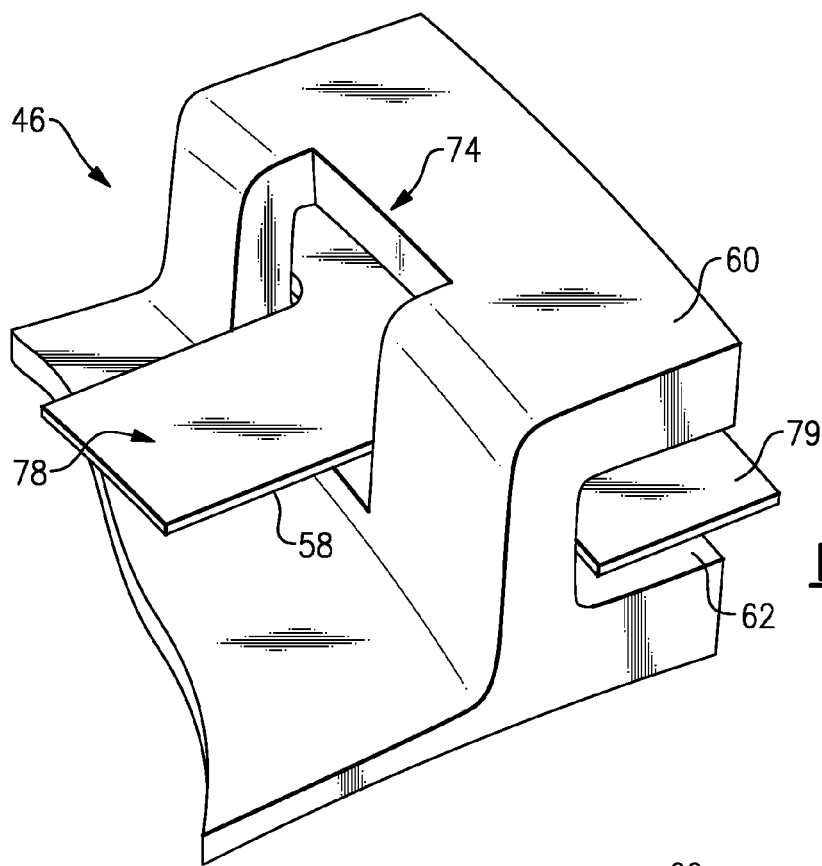
FIG. 7 illustrates a perspective view of a tab extending from a feather seal through a slot to retain the feather seal within the seal channel.
Figure 8:
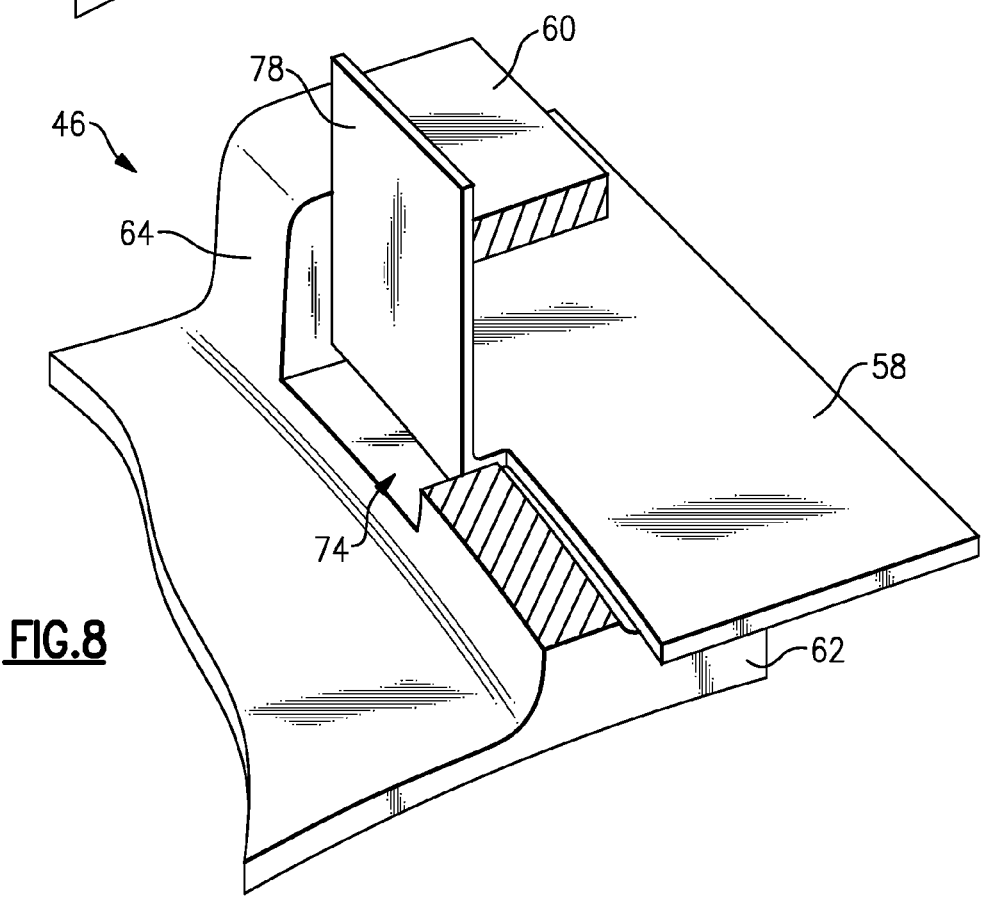
FIG. 8 illustrates a sectional view showing an example tab that has been bent.

Referring to FIGS. 7 and 8, the tab 78 of the feather seal 58 extends through the slot 76 with an adequate amount of clearance such that the tab 78 can be deformed (e.g., bent) to retain the feather seal 58 in the seal channel 56. Deforming the tab 78 (upwards in FIG. 8) provides the benefit of locking the feather seal 58 relative to the seal channel 56 and also preventing axial movement of the feather seal 58. For example, the tab 78 may be deformed manually and may be deformed to any desired angle. Thus, the feather seal 58 is thereby secured within the seal channel 56 to reduce the opportunity of damaging the feather seal 58 during assembly into a vane ring.

Figure 9:
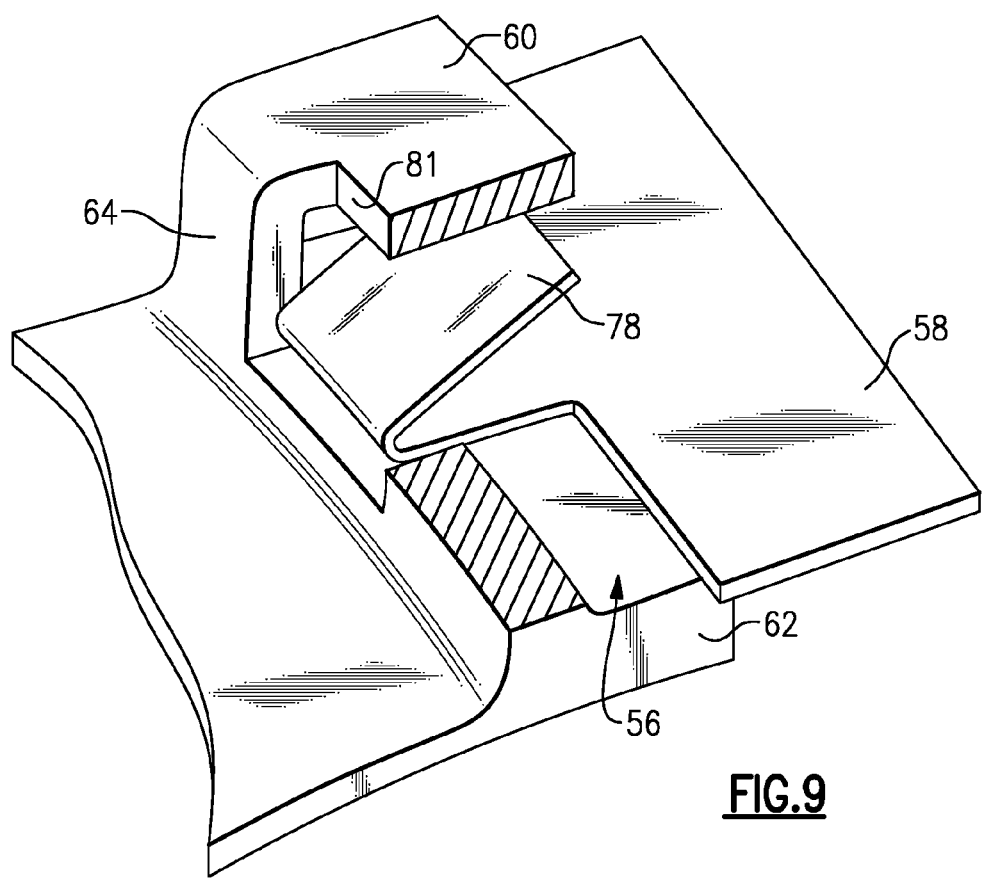
FIG. 9 illustrates a sectional view of another bent tab.

Alternatively, as shown in FIG. 9, the tab 78 is deformed before insertion through the slot 76 such that the tab 78 is non-planar. In this example, the tab 78 is compressed as it is inserted through the slot 76. After the end of the tab 78 clears the channel sidewall 60, the tab 78 decompresses because of the resilience of the material of the feather seal 58, such that the end of the tab 78 abuts a surface 81 of the channel sidewall 60 to retain the feather seal 58 within the seal channel 56.

Figure 10:
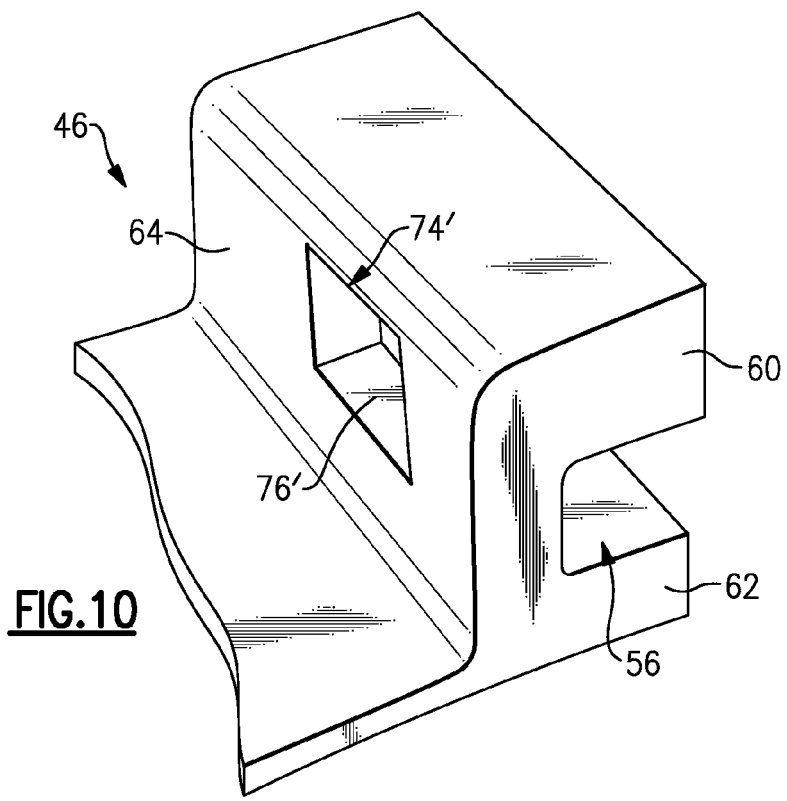
FIG. 10 illustrates another embodiment of an example retention feature.
Figure 11:
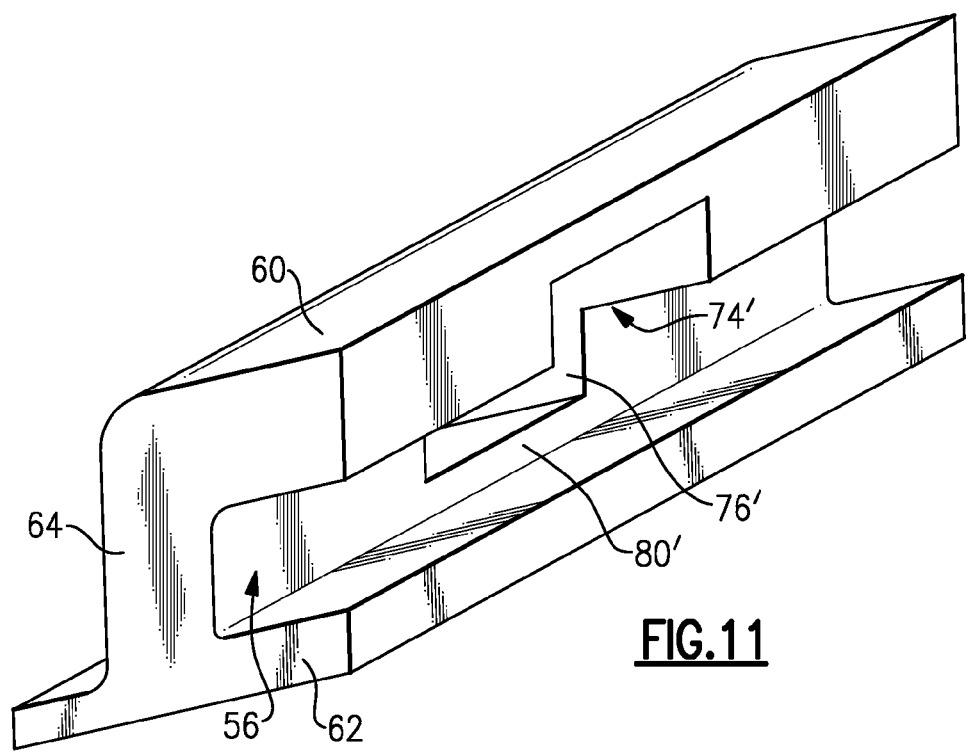
FIG. 11 illustrates an alternate view of the retention feature.
Figure 12:
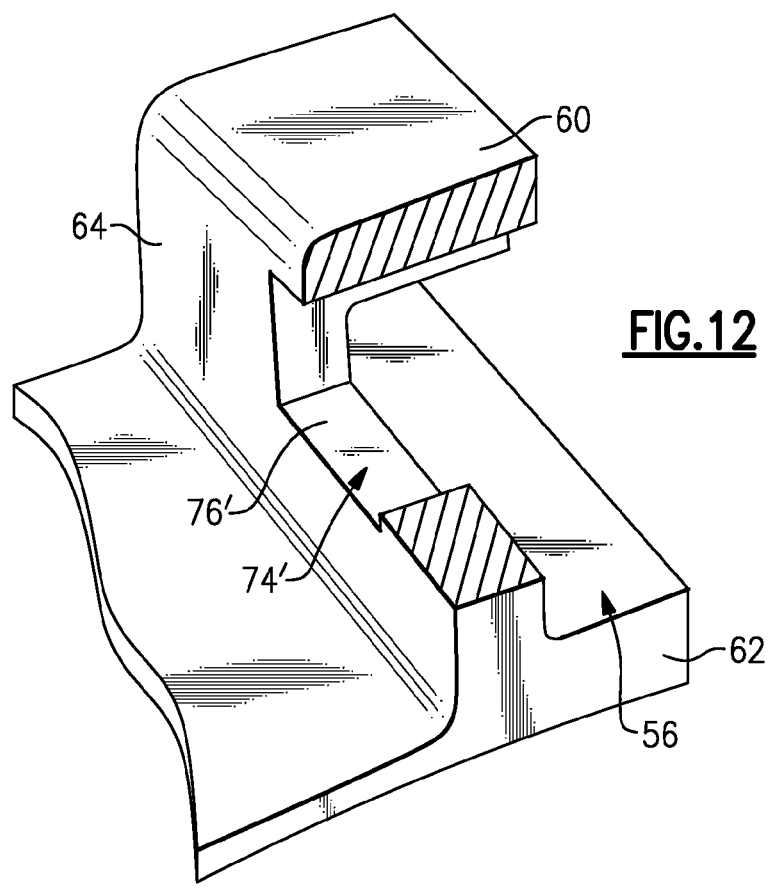
FIG. 12 illustrates a sectional view of the retention feature.

FIGS. 10, 11, and 12 illustrate another embodiment retainer feature 74' that includes a slot 76' for retaining the feather seal 58 in a manner similar to as described above. In this example, the slot 76' extends entirely through the channel bottom wall 64 and entirely through the channel sidewall 60, but does not extend at all into the channel sidewall 62. Thus, in this example, there is a step 80' between the channel sidewall 62 and the slot 76'.

Figure 13:
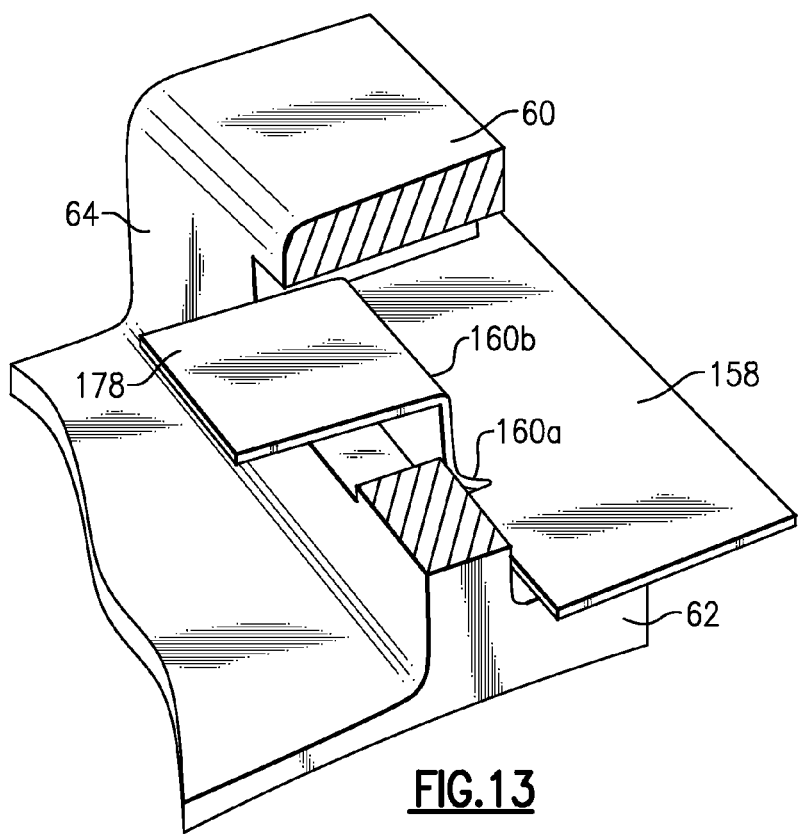
FIG. 13 illustrates a sectional view of another bent tab.

As shown in FIG. 13, the slot 76' receives a tab 178 of another type of feather seal 158. In this example, the tab 178 includes two curved sections 160a and 160b that form a serpentine shape that allows the tab 178 to extend over the step 80' and into the slot 76'. The forward and trailing sides of the slot 76' abut the forward and trailing ends of the tab 178 to limit circumferential movement between the feather seal 158 and the seal channel 56. Also, the step 80' abuts a portion of a tab 178 to limit relative axial movement of the feather seal 158.

Figure 14:
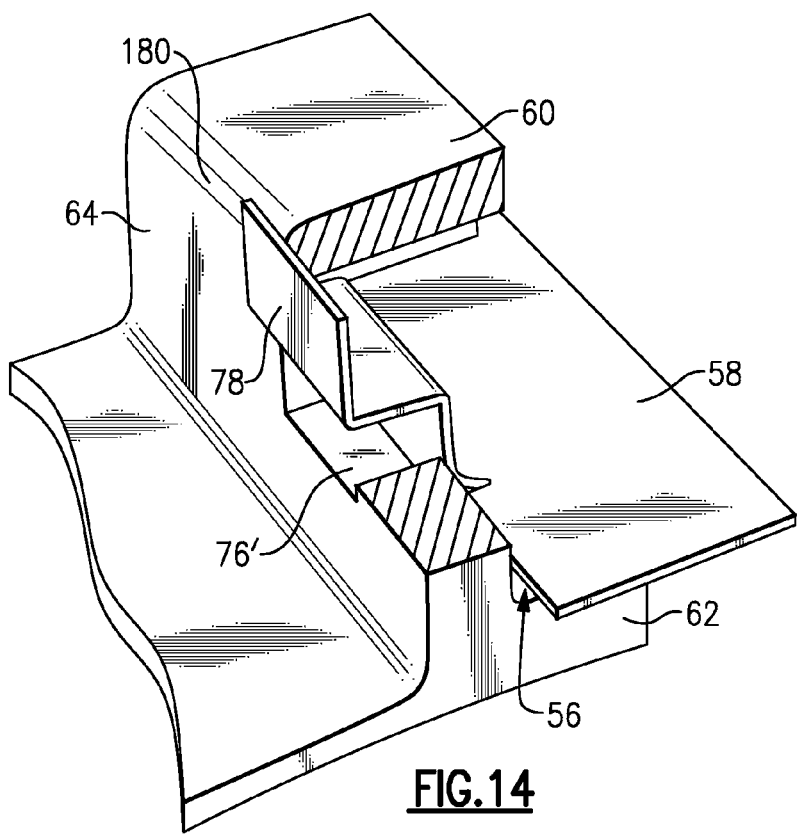
FIG. 14 illustrates a sectional view of another bent tab.

As shown in FIG. 14, after the tab 178 is received through the slot 76', the tab 178 is deformed such that the end of the tab 178 abuts against a corner 180 between the channel sidewall 60 and the channel bottom wall 64 to further limit movement of the feather seal 58.

Figure 15:
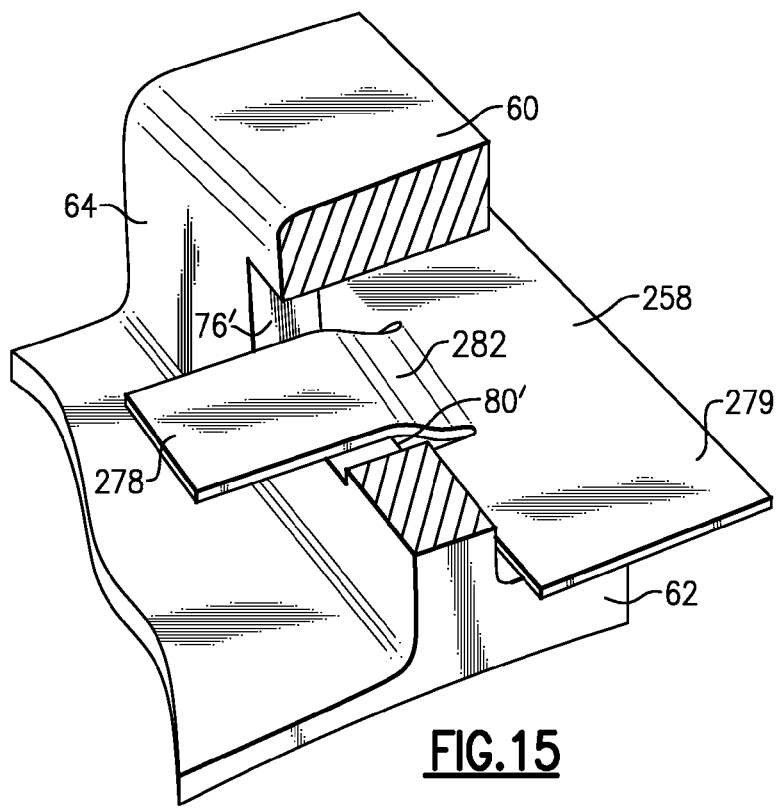
FIG. 15 illustrates a sectional view of another bent tab.
Figure 16:
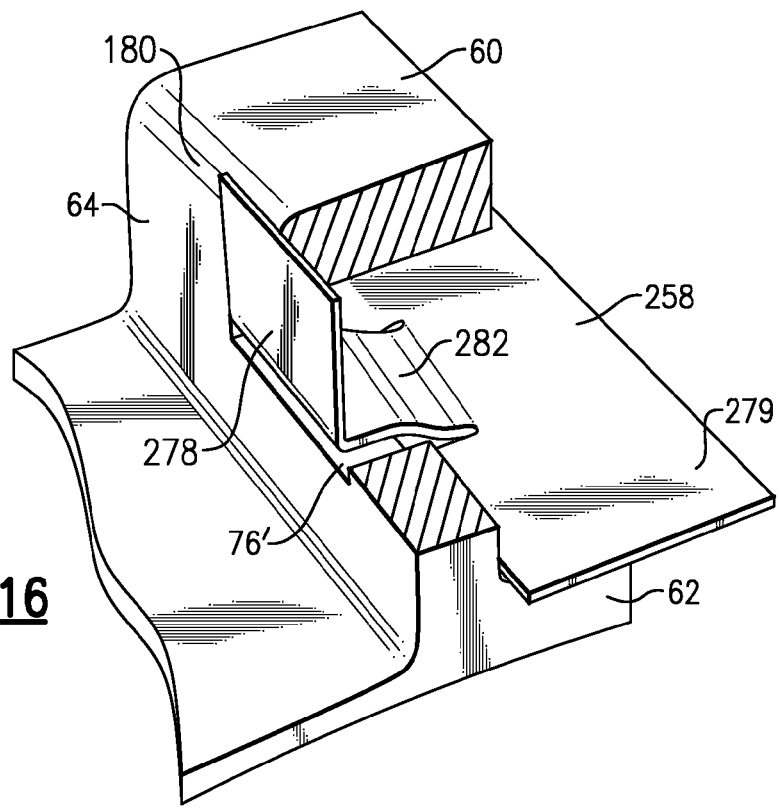
FIG. 16 illustrates a sectional view of another bent tab.

Referring to FIG. 15, another embodiment feather seal 258 and tab 278 is shown. In this example, a plane defined by the tab 278 is offset using a curved section 282 from a plane defined by a main body section 279 of the feather seal 58. The curved section 282 allows the tab to extend over the step 80' and into the slot 76'. Similar to the tab 178 of the previous examples, the tab 278 may be deformed upwards as shown in FIG. 16 to further limit movement between feather seal 258 and the seal channel 56.

It should be understood that relative positional terms such as "circumferential," "forward," "aft," "tupper," "lower," "above," "below," and the like are with reference to the normal operational attitude of the turbine engine 10 and should not be considered otherwise limiting.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A seal component comprising:
a body including two circumferential sides, a leading end, and a trailing end, wherein at least one of the circumferential sides includes a first channel sidewall, a second channel sidewall, and a channel bottom wall joining the first channel sidewall and the second channel sidewall to define a seal channel for receiving a seal, at least the channel bottom wall includes a slot for limiting movement between the seal and the seal channel, and the slot extends entirely through the channel bottom wall, wherein the slot includes a step that is offset with respect to the second channel sidewall.

2. The seal component as recited in claim 1, wherein the slot extends at least partially through the first channel sidewall and the second channel sidewall.

3. The seal component as recited in claim 1, further comprising the seal, wherein the seal includes a corresponding retention feature that cooperates with the slot of the seal channel to limit movement between the seal and the seal channel.

4. The seal component as recited in claim 3, wherein the retention feature of the seal comprises a tab that is receivable at least partially within the slot.

5. The seal component as recited in claim 4, wherein the tab is non-planar.

6. The seal component as recited in claim 4, wherein the seal includes a seal body defining a plane and the tab extends from the seal body in a direction that is substantially perpendicular to the plane.

7. The seal component as recited in claim 1, wherein the body comprises a platform that is coupled with an airfoil section.

8. The seal component as recited in claim 1, wherein the body comprises a turbine blade air seal.

9. A seal assembly comprising:
a first component;
a second component adjacent the first component, wherein the first component and the second component each include a body having two circumferential sides, a leading end, and a trailing end, wherein one of the circumferential sides of the first component is adjacent one of the circumferential sides of the second component and the circumferential sides each include a seal channel, and at least one of the seal channels comprises a first channel sidewall, a second channel sidewall, and a channel bottom wall joining the first channel sidewall and the second channel sidewall to define the seal channel, the channel bottom wall includes a slot, and the slot extends entirely through the channel bottom wall, wherein the slot includes a step that is offset with respect to the second channel sidewall; and
a seal at least partially within the seal channels, the seal including a retention feature that cooperates with the slot to limit movement between the seal and the seal channels.

10. The seal assembly as recited in claim 9, wherein the retention feature comprises a tab that is receivable at least partially within the slot.

11. The seal assembly as recited in claim 10, wherein the tab is non-planar.

12. The seal assembly as recited in claim 9, wherein the slot extends at least partially through the first channel sidewall and the second channel sidewall.

13. The seal component as recited in claim 1, wherein the slot includes a size that is at least as great as a combined dimensional variation from manufacturing of the body and the slot.

14. The seal component as recited in claim 1, further comprising the seal, wherein the seal includes a tab extending through the slot and projecting outwardly from the channel bottom wall.

15. The seal component as recited in claim 14, wherein the portion of the tab projecting outwardly from the bottom wall bends back toward the channel bottom wall.

16. A seal component comprising:
a body including two circumferential sides, a leading end, and a trailing end, wherein at least one of the circumferential sides includes a first channel sidewall, a second channel sidewall, and a channel bottom wall joining the first channel sidewall and the second channel sidewall to define a seal channel for receiving a seal, at least the channel bottom wall includes a slot for limiting movement between the seal and the seal channel, and the slot extends entirely through the channel bottom wall, wherein the seal includes a tab extending through the slot and projecting outwardly from the channel bottom wall, wherein the portion of the tab projecting outwardly from the channel bottom wall bends back toward the bottom wall and abuts the first channel sidewall.

17. A seal component comprising:
a body including two circumferential sides, a leading end, and a trailing end, wherein at least one of the circumferential sides includes a first channel sidewall, a second channel sidewall, and a channel bottom wall joining the first channel sidewall and the second channel sidewall to define a seal channel for receiving a seal, at least the channel bottom wall includes a slot for limiting movement between the seal and the seal channel, and the slot extends entirely through the channel bottom wall, wherein the seal includes a tab extending through the slot and projecting outwardly from the channel bottom wall, wherein the slot includes a step that is offset with respect to the second channel sidewall and wherein the portion of the tab projecting outwardly from the bottom wall bends back and abuts the first channel sidewall.

* * * * *